United States Patent [19]
Baker et al.

[11] Patent Number: 5,632,962
[45] Date of Patent: May 27, 1997

[54] PROCESS VESSEL

[75] Inventors: Salah A. Baker, Old; Brian Waldie, Biggar, both of Scotland

[73] Assignee: British Technology Group Limited, London, England

[21] Appl. No.: 454,226

[22] PCT Filed: Dec. 13, 1993

[86] PCT No.: PCT/GB93/02536

§ 371 Date: Jun. 14, 1995

§ 102(e) Date: Jun. 14, 1995

[87] PCT Pub. No.: WO94/13398

PCT Pub. Date: Jun. 23, 1994

[30] Foreign Application Priority Data

Dec. 15, 1992 [GB] United Kingdom ............... 9226129

[51] Int. Cl.⁶ ............... B01J 19/24; B01J 10/02; B01D 53/18; B01D 3/00

[52] U.S. Cl. ............... 422/211; 422/220; 422/228; 261/79.2; 261/91; 261/97; 366/337; 366/339

[58] Field of Search ............... 422/211, 220, 422/228; 261/91, 97, 79.2; 366/268, 337, 338, 339

[56] References Cited

U.S. PATENT DOCUMENTS

| | | |
|---|---|---|
| 2,639,130 | 3/1953 | Heere . |
| 2,643,220 | 6/1953 | Loumiet et Lavigne . |
| 3,099,697 | 7/1963 | Lerman . |
| 3,930,816 | 1/1976 | Miczek ............... 55/238 |
| 3,990,870 | 11/1976 | Miczek ............... 55/92 |
| 4,193,205 | 3/1980 | Black ............... 261/79.2 |
| 4,203,961 | 5/1980 | Cowley ............... 423/478 |
| 4,382,045 | 5/1983 | Wem ............... 261/89 |
| 4,832,500 | 5/1989 | Brunold et al. ............... 366/268 |

FOREIGN PATENT DOCUMENTS

| | | |
|---|---|---|
| 48088 | 3/1982 | European Pat. Off. . |
| 1269047 | 1/1960 | France . |
| 367610 | 1/1923 | Germany . |
| 299075 | 10/1928 | United Kingdom . |
| 764650 | 12/1956 | United Kingdom . |
| 769228 | 3/1957 | United Kingdom . |
| 961442 | 6/1964 | United Kingdom . |
| 1447687 | 8/1976 | United Kingdom . |
| 2273888 | 7/1994 | United Kingdom . |

OTHER PUBLICATIONS

John A. Weedman et al, "Rectification of Liquid Air in a Packed Column", Industrial and Engineering Chemistry, vol. 39, No. 6, pp. 732–744.

D. J. Gunn, "Theory of Liquid Phase Dispersion in Packed Columns", Chemical Engineering Science, vol. 35, pp. 2405–2413, 1980.

J. W. Mullin, "The Effect of Maldistribution on the Performance of Packed Columns", The Industrial Chemist, Aug. 1957, pp. 408–417.

*Primary Examiner*—Nina Bhat
*Attorney, Agent, or Firm*—Cushman, Darby & Cushman IP Group of Pillsbury Madison & Sutro LLP

[57] ABSTRACT

A process vessel (2) is for achieving contact between at least one fluid passing through the vessel (2) and a packing material contained therein. The process vessel (2) has a peripheral wall (8) disposed around a longitudinal axis, an inlet for permitting entry of fluid into the vessel and an outlet for permitting the exit of fluid from the vessel. A redistributor (4) is located within the vessel (2) and the redistributor (4) follows a locus (3) which extends around the inside surface (10) of the peripheral wall (8). The locus (3) is neither perpendicular or parallel to the longitudinal axis and is preferably spiral or helical.

17 Claims, 12 Drawing Sheets

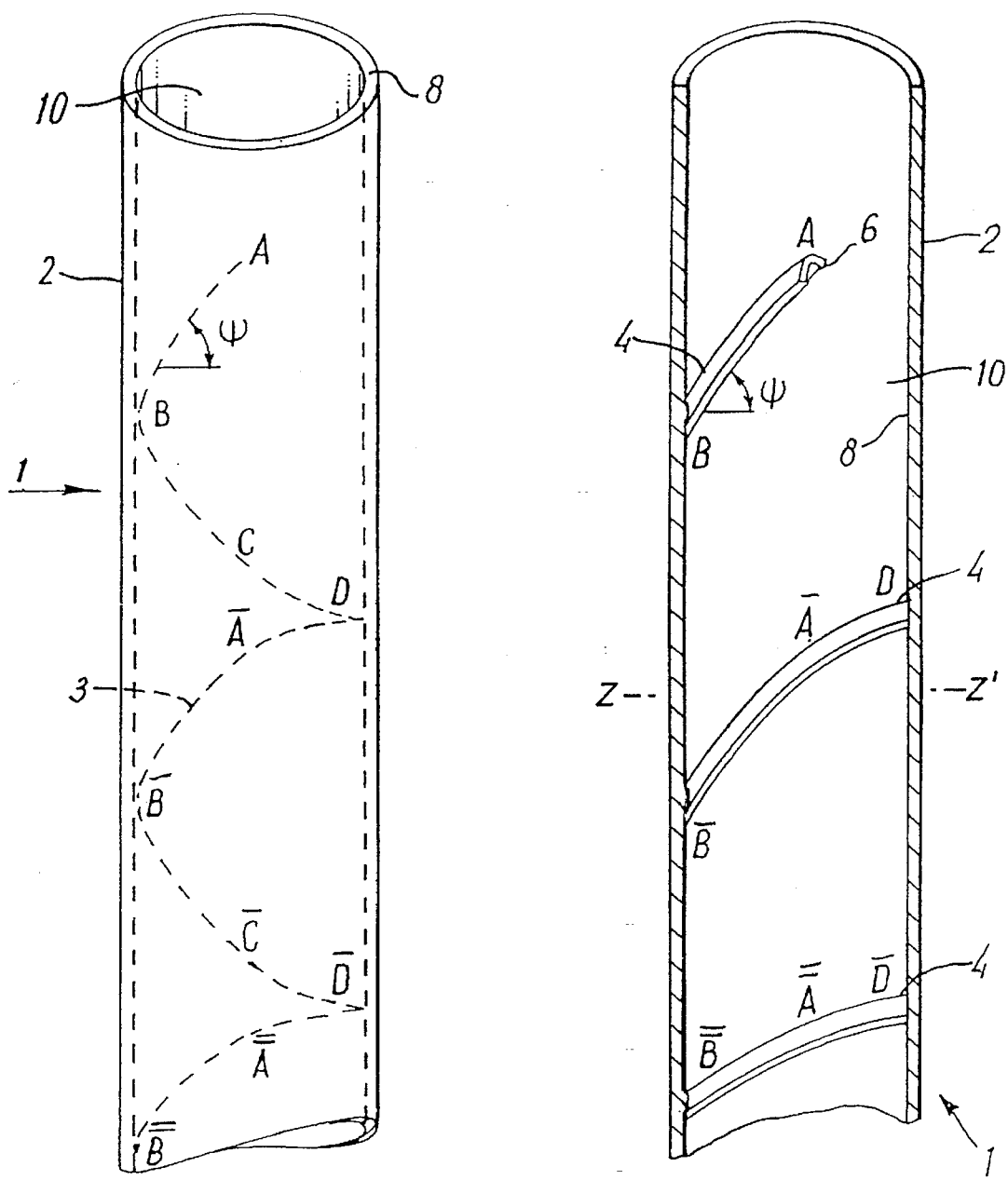
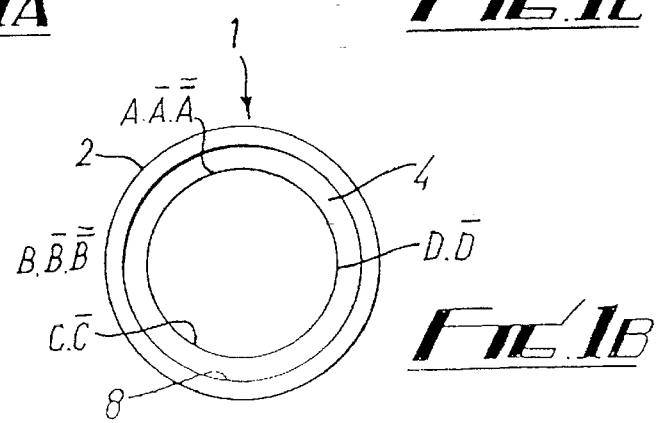

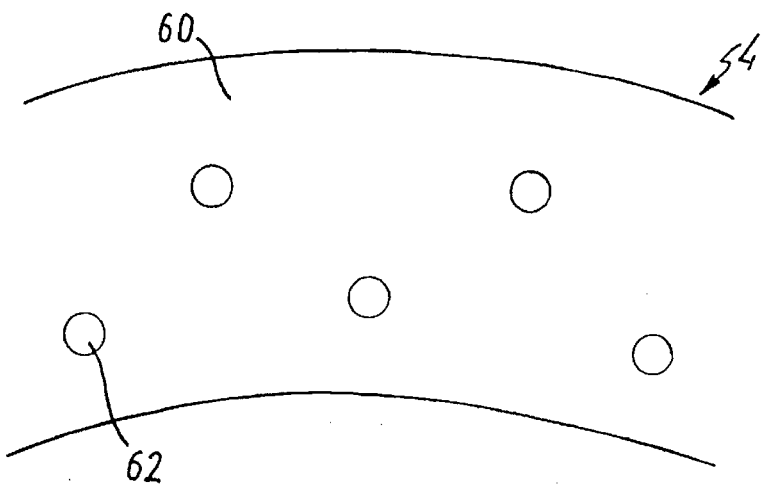
FIG. 7
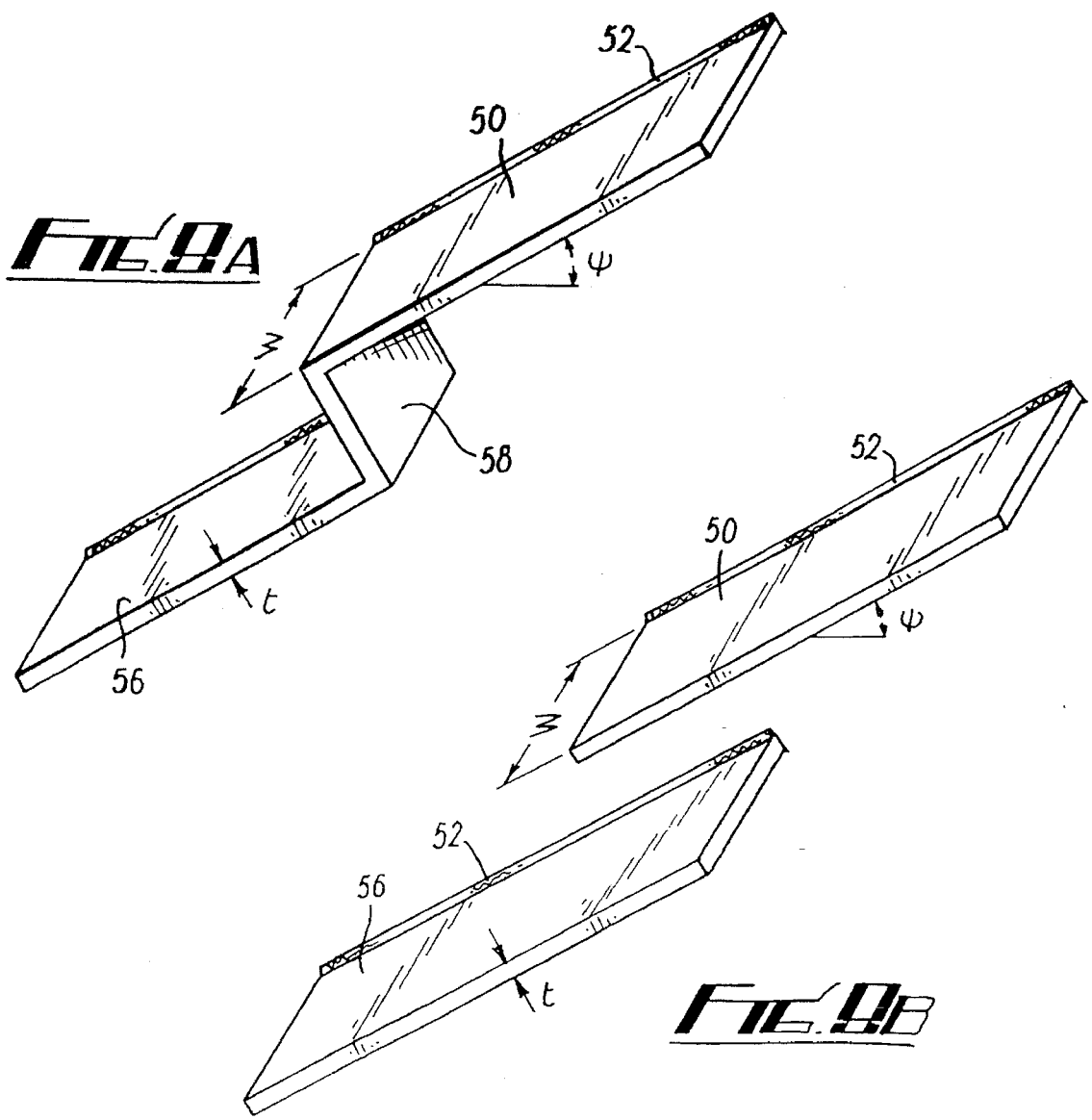
FIG. 8A
FIG. 9B

PROCESS VESSEL

This invention relates to a contacting column redistributor for use in effecting improved fluid distribution through a process vessel.

Columns with dumped or random packings, stacked packings or structured packings are widely used in the chemical, oil, gas and other process industries for separation processes (for example, absorption, desorption, rectification, stripping and distillation) and as reactors in which packings are used to bring gases and liquid into direct contact in order to transfer heat or constituents from one phase to the other. Two of the great advantages of packed columns are the low capital cost and the large contact area of packings.

Liquid and gas channelling and the difficulty of adding or removing heat are the main shortcomings of packed columns.

Packed columns suffer from liquid and gas channelling even when they are vertically positioned, and this channelling can cause a reduction in column efficiency, while packed columns which are used on board floating platforms and processing ships may suffer a much more serious liquid and gas channelling due to tilt and motion caused by marine waves. Channelling could cause a severe reduction of performance even under tilt of a few degrees.

The channelling type and severity could depend on whether the columuns are used onshore or offshore, as will be explained as follows:

Onshore Applications

The main short comings of the vertically positioned packed column (VPPC) is the non uniform distribution of the liquid and gas phase over the whole cross-sectional area of the column due to voidage variation near the wall area. The wall area width is equal to one packing diameter, (Gunn, D. J. 1980 Chem Eng Sci 35 2405).

The voidage near the wall is higher than that at the rest of the cross sectional area of the packed column. This voidage variation will lead to the channelling of liquid and gas phases through the wall area. More serious channelling could take place if the liquid distributor, located at the top of the column, was tilted, partially blocked or poorly designed or constructed.

It has been reported by Baker S. A. 1980 M Sc thesis, University of Wales and by Baker S. A. 1987, Ph D thesis, University of Wales that packed columns may suffer from liquid and gas channelling even with the supposedly good design criteria i.e. with high ratio of column diameter to packings diameter. This finding was valid for co-current and counter-current operations. Many workers, among them Morris G. A. and Jackson J. 1953, Absorption Towers, London: Butterworths Scientific publications and Mullin J. W. 1957, Industr Chem Mfr 33 408 have shown that liquid and gas maldistribution can effect the efficiency and performance of the packed column and reduce the number of mass transfer stages in a given depth of packing. The magnitude of this reduction varies with the degree of maldistribution being studied. It has been reported that very long, onshore used, packed columns which tilted under the effect of high wind, or their own weight or from thermal effects or which tilted when their foundation settled, suffered additional performance reduction similar to the performance reduction suffered by tilted packed columns used offshore on board floating production platforms and ships.

Offshore Applications

There are increasing demands for floating oil production platforms; as well as being cheaper than fixed production platforms, they can be relatively easily relocated after the depletion of the oil of the field. Also there are increasing demands for offshore chemical plants mounted on board ships, as they become more favourable than onshore chemical plants for certain duties due to rising expenses in construction of waste disposal and pollution control plants.

Floating platforms and processing ships permit some horizontal and vertical motion and tilt. This motion and tilt can cause severe liquid and gas channelling, which could lead to a severe reduction in the performance of the packed columns. The main cause of the reduction in the performance of the tilted packed columns is due to the severe liquid and gas channelling, where liquid tends to channel through one side of the column and the gas channels through the other side of the column, hence reducing the total surface area of contact between the liquid phase and the gas phase, and reducing the degree of contact between the two phases in the column whether the process is distillation, absorption, desorption, stripping, or chemical reaction.

A permanent inclination is considered to be the most critical situation for a separation column. Some authors have described the efficiency drop of packed columns in inclined positions.

For a distillation column Weedman J. A. and Dodge B. F. 1947, Ind and Engng Chem 29 732 have shown that, beginning at about 1° inclination, efficiency drastically drops to about 50% at 2.5°.

At present there are fluid redistributors designed to correct channelling in process vessels at discrete positions along the length of the vessel. However these redistributors are designed such that the fluid is redistributed on specific planes of the packed column which creates a sizeable bottleneck in higher flow rates of the fluid and can occupy a significant volume of the column and increase column weight.

In a tilted or moving column, these fluid redistributors may increase the liquid and gas channelling and accelerate its occurrence due to their design which help transfer the liquid quickly to the lower inclined part of the column from the other part of the column of the same axial level.

According to the present invention there is provided a process vessel for achieving contact between at least one fluid passing through the vessel and a packing material contained therein, the process vessel comprising a peripheral wall disposed around a longitudinal axis and having an inlet for permitting entry of fluid into the vessel and an outlet for permitting exit of fluid from the vessel, the vessel including a redistributor which follows a locus which is not perpendicular or parallel to the longitudinal axis.

The process vessel may be an upright cylinder, square or rectangular prism or any other suitable shape; alternatively its cross-sectional area may vary along its height, for example in the form of a frusto-cone.

Typically, other inlet and outlet configurations of the processing vessel are possible. For example one outlet at one end and one inlet and one outlet at the other end or one inlet at one end and one outlet at the other end to permit two or more fluids to be passed through the vessel in either the same direction or different directions. Alternatively, one or more of the inlets and/or outlets may be located away from the ends.

Typically, said process vessel is a contacting column for use in achieving mutual contact between a first and a second fluid flowing therethrough and the packing material contained therein or between the fluid and the packing material.

The redistributor may be in the form of a single element or the form of a discontinuous element comprising a number of sections.

Preferably, the element extends around the vertical axis within the process vessel and generally follows the internal contours of the peripheral wall of said vessel.

In some structures two or more elements may be used.

Typically, on any plane drawn at right angles to the longitudinal axis the element or elements do not occupy more than a small proportion, typically less than 20%, for example less than 10%, preferably less than 5%, most preferably less than 1%, of the total cross sectional area of the process vessel as measured on that plane. One of the benefits of this is the reduction in the potential for flooding of the vessel in some operating conditions.

The element is continuous at least for some minimum length. For vessels which are symmetrical about the longitudinal axis, such as right cylindrical and frusto-conical vessels, the element may extend along a generally helical path. The number of turns of the helical element per unit height of vessel can be selected over a wide range and may vary over the total height of a vessel. The generally helical path may be either clockwise or anti-clockwise in direction of rotation or both. For a discontinuous element, the different sections may have different directions of rotation.

Preferably, the element has one edge connected to the internal surface of the peripheral wall and another edge spaced from the axis. The former edge of the element should be sufficiently close to the internal surface of the peripheral wall to avoid substantial flow of a second fluid up the wall. The element may be mounted by any convenient means e.g. by means of welding, gluing, screws, brackets or jamming. One means of jamming a helical element is to partially rotate one end relative to the other in order to reduce the external overall diameter of the helix. Once the element is placed inside the column it is then allowed to expand towards its natural larger diameter by which expansion it becomes jammed inside the column. Removal from the column may be accompanied by reversing this procedure. The element can also be made as an integral part of the peripheral wall or mounted on a support rail.

Preferably the element or elements are distributed around the entire circumference of the vessel such that there is no clear through line down the inner surface wall of the vessel, when viewed along the longitudinal axis.

Alternatively, the element may be connected to structured packings of a packed process vessel. This is to improve the sealing of the structured packing to the inside wall of the column and to improve distribution of fluids in a vertical or tilted column.

The element may be provided with holes of a suitable number and size and shape, for example, to provide some flow of a first fluid to the peripheral wall region directly below the element while allowing part of a second fluid to flow through the holes. For an element fitted with holes, the size and spacing of the holes may differ at different positions in the vessel as, for example, near the top and base of said vessel.

The element may be plane, corrugated, tubular, V or other convenient section, and may be at right angles to or oblique to the peripheral wall.

Preferably, the element has one or more baffles fixed to a lower face of the element for directing a second fluid from the peripheral wall region to a central region and to skim off any liquid which may flow on or below the lower face of the element.

The element may have extended vanes of equal or varying lengths projecting radially inwardly towards the central region for help in directing a first fluid further away from the peripheral wall region towards the central region.

In certain examples of the invention, the element may have a weir on an upper face or on an outer edge to enhance redistribution of a first fluid when flowing at a higher rate. The top edge of the weir, if fitted, may be notched or serrated.

Preferably, the element is suitable for co-current and counter-current operations and for vessels in which one fluid flows through a bed of solid particles. In a co-current operation, a first and second fluid flow in the same direction whereas in a counter-current operation a first and second fluid flow in generally opposite directions.

Typically, the invention is suitable for all types of packings, such as random, dumped, stacked or structured packings. Such packings may be used for operations such as distillation, stripping, absorption, adsorption, liquid extraction or chemical reactions.

The element may be solid in cross-section or hollow. A hollow or solid element may have a square, rectangular, circular or other convenient cross-section. An element of hollow cross-section may also be utilised to add or remove heat from the fluid or fluids by providing an internal flow of heating or cooling medium as appropriate. Alternatively, heat transfer surfaces could be introduced directly above or below the element to heat or cool fluid which flows preferentially on or near the element.

The lower end of an element nearest the base of the process vessel may be fitted with a transverse weir or other arrangement to impede flow of liquid off that end and thus improve liquid distribution below the element.

At the top of a vessel the element may be designed to help the initial liquid distribution e.g. by extending the element under the feed zone and having a higher number of holes per unit area in that zone.

Another advantage of the present invention in some applications is reduction in pressure drop over the packed vessel by permitting the use of larger packings without the usual disadvantage of greater wall channelling of liquid and/or gas.

Foaming can occur in some packed vessels and adversely affect performance. The present vessel may enable the gas to sweep part of the foam onto the element where it will have more opportunity to collapse.

Typically, the fluid or fluids flowing through the process vessel comprise a liquid or a gas or combination thereof. Typically, the first and second fluids may be respectively a liquid and a gas.

Embodiments of the invention will now be described, by way of example, with reference to the accompanying drawings in which:

FIG. 1A is an isometric view of a first embodiment of a process vessel and redistributor in accordance with the present invention;

FIG. 1B is a top plan view of FIG. 1A;

FIG. 1C is a sectional view of FIG. 1A;

FIG. 7 is a plan view of a portion of a sixth embodiment of the redistributor provided with holes;

FIG. 8A is an isometric view of two portions of the redistributor of FIG. 6A connected by a plane at right angles to the two sections;

FIG. 8B is an isometric view of two portions of the redistributor of FIG. 6A not connected;

Figure 2A:
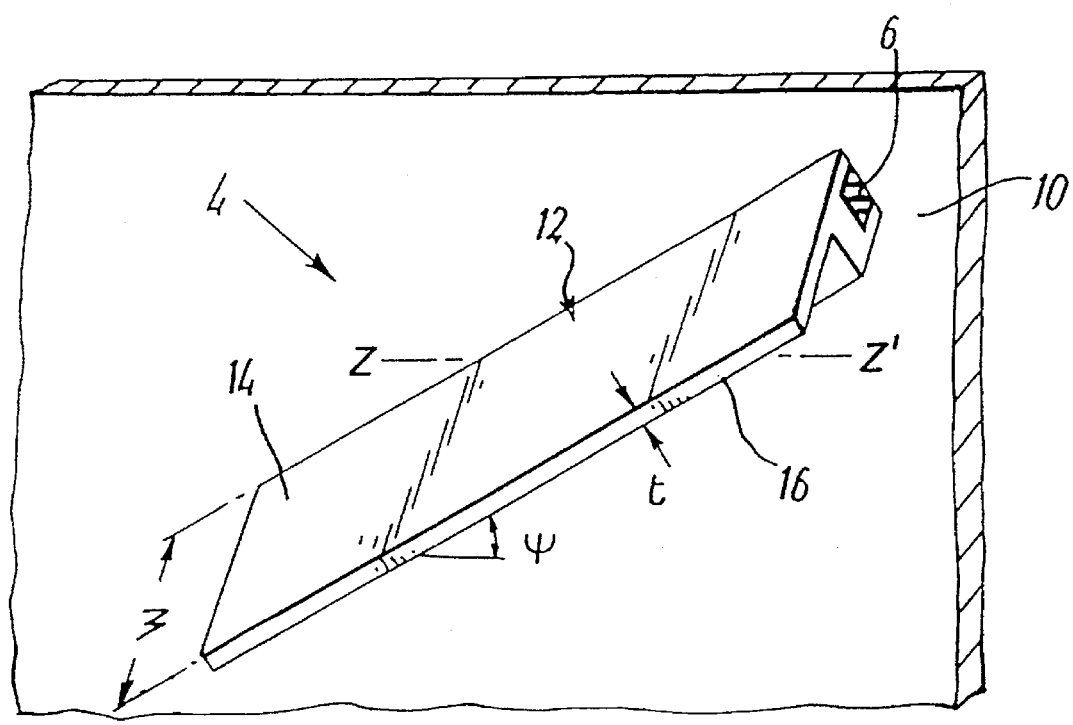
FIG. 2A is an isometric view of a portion of a first embodiment of the redistributor.

For the sake of clarity packings are not shown in FIGS. 1 to 8, and 10 to 12.

Referring to FIGS. 1A to 1C which show a first embodiment of a process vessel and redistributor 1, the process vessel and redistributor 1 comprises a process vessel 2 in the form of a cylindrical column and a redistributor 4 which follows a generally helical locus 3. The redistributor 4 is connected by a supporting rail 6 to an inside face 10 of a column wall 8. The symbol " " represents the angle between the helical wall redistributor 4 and a horizontal.

The length of the helical wall redistributor 4 is the helical distance between point A and B" passing through the points B, C, D, A', B', C', D', and A". The length depends on the inside diameter of the column 2 and the number of loops used and the angle between the plane of the helical wall redistributor 4 and the horizontal " ".

Figure 6A:
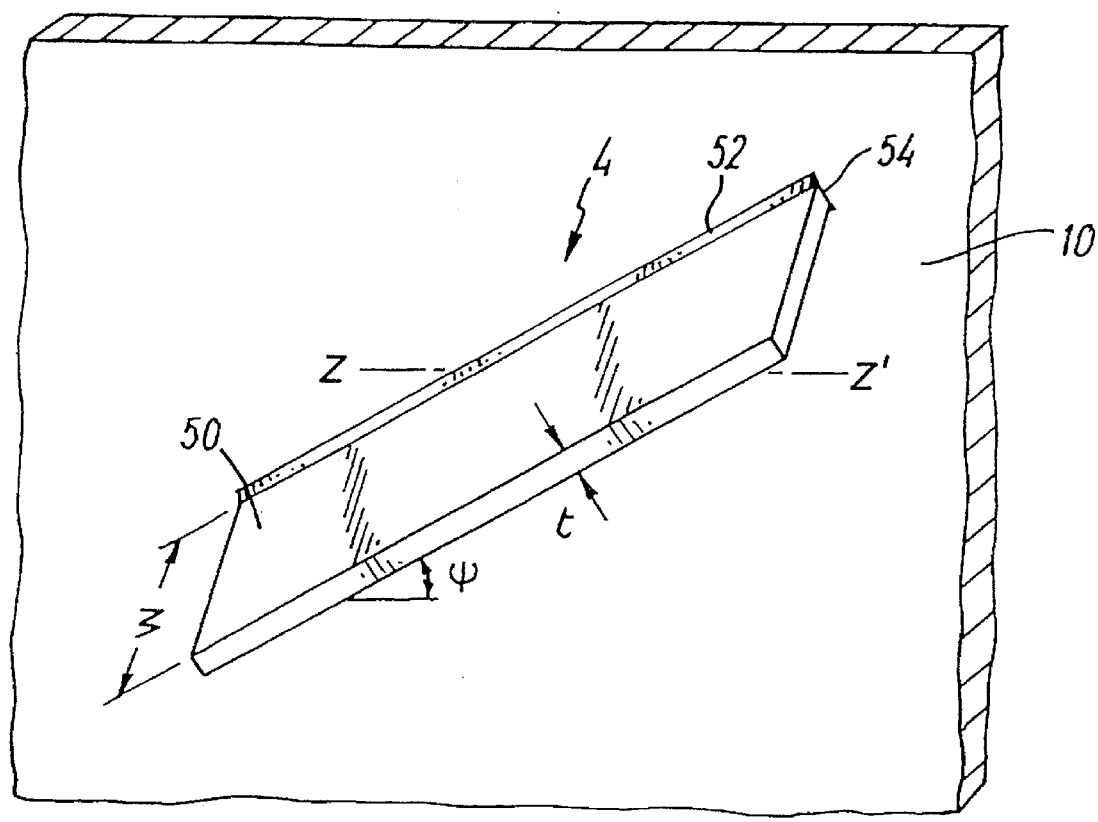
FIG. 6A is an isometric view of a portion of a fifth embodiment of the redistributor.

In FIGS. 1C, 2A and 6A, ZZ' defines a plane at right angles to the longitudinal axis. It can be seen from FIG. 1C that the proportion of cross-sectional area of the process vessel obstructed by the redistributor 4 in that plane is small.

Figure 2B:
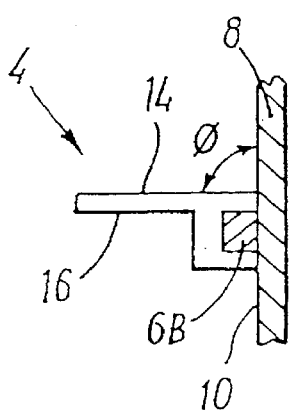
FIG. 2B is a side view of FIG. 2A.
Figure 2C:
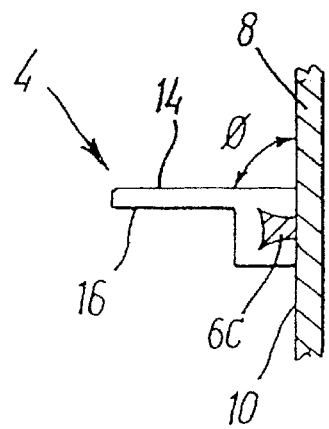
FIG. 2C is a side view of FIG. 2A provided with a self-locking supporting rail.

FIGS. 2A to 2C represent, in greater detail, a first embodiment of a short portion of the helical wall redistributor 4. The helical wall redistributor 4 comprises a helical plate 12 having an upper face 14 and a lower face 16. The plate 12 has a width w and a thickness t. An angle, ø, between the plane of the upper face 14 of the helical wall redistributor 4 and the plane of the column wall 10 is equal to 90°. The helical wall redistributor is supported by the supporting rail 6B (as shown in FIG. 2B) to the inside face 8 of the column wall 10. This may be by gluing, welding or other means. In FIG. 2C the supporting rail 6C has a self locking design.

The plane ZZ' at right angles to the horizontal axis as shown in FIG. 2A shows the small proportion of cross-sectional area of the process vessel obstructed by the redistributor 4 in that plane.

Figure 3A:
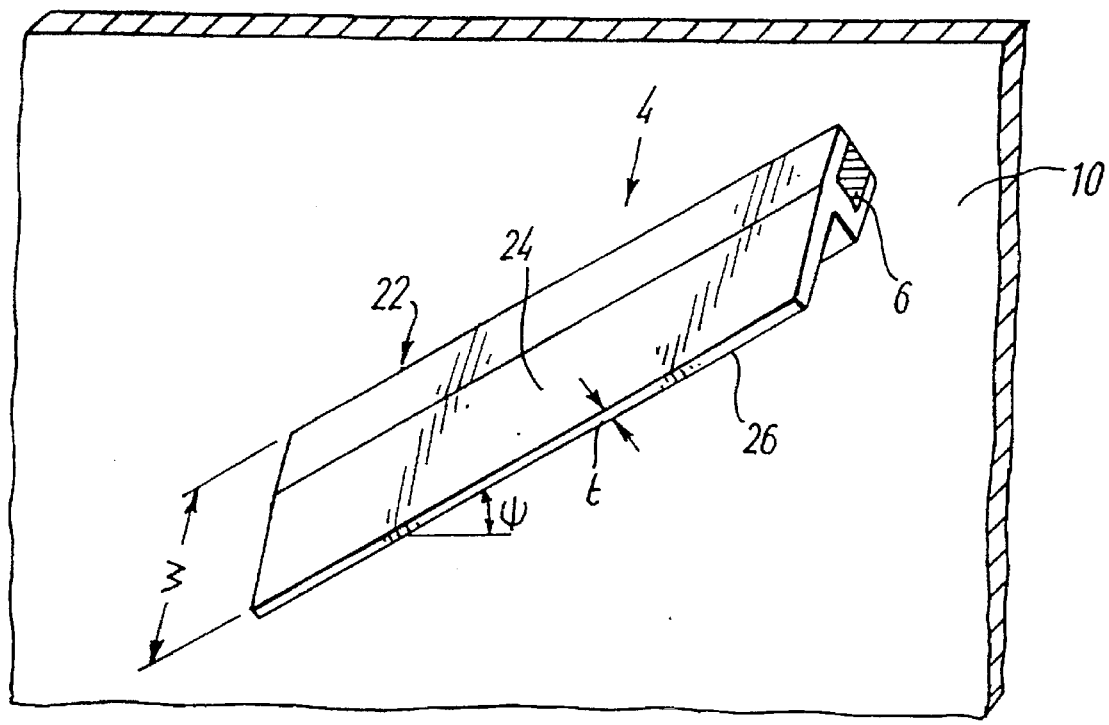
FIG. 3A is an isometric view of a portion of a second embodiment of the redistributor.
Figure 3B:
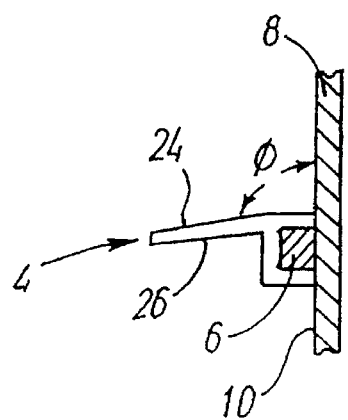
FIG. 3B is a side view of FIG. 3A.

Referring to a second embodiment of the helical wall redistributor 4 as shown in FIGS. 3A and 3B, the helical wall redistributor 4 is similar to that shown in FIGS. 2A to 2C with part of the upper face 24 and the lower face 26 of the helical plate 22 at an oblique angle. The angle ø between part of the plane of the upper face 24 of the helical wall redistributor 4 and the plane of the column wall 10 is a value other than 90° resulting in the oblique angle of the helical plate 22.

Figure 4A:
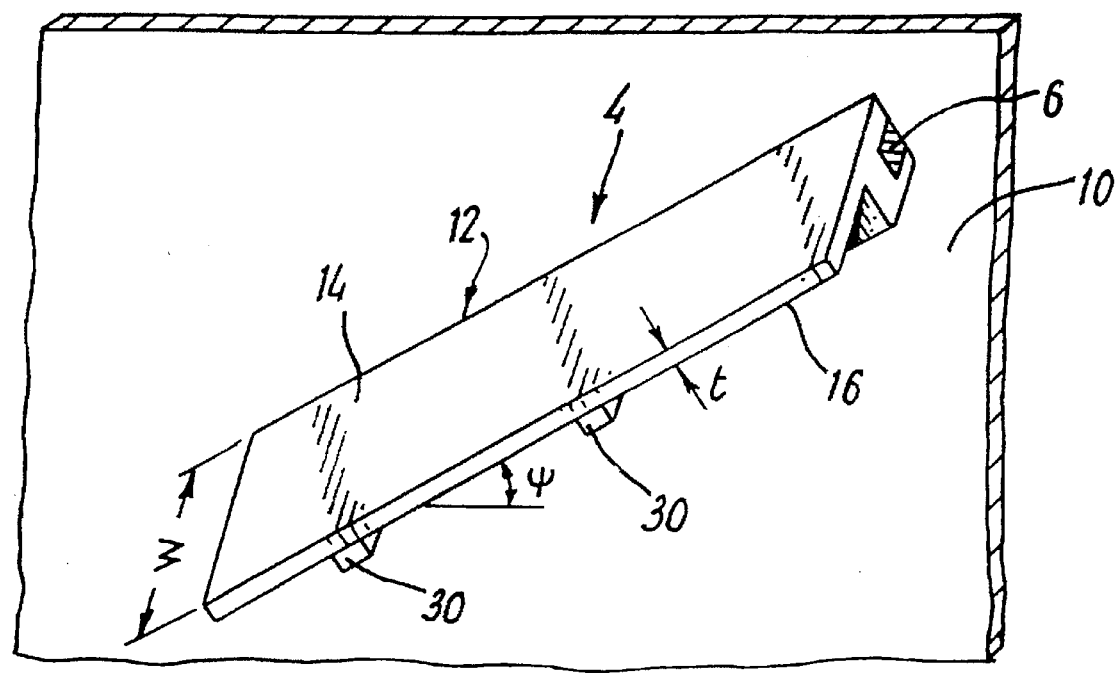
FIG. 4A is an isometric view of a portion of a third embodiment of the redistributor provided with baffles.
Figure 4B:
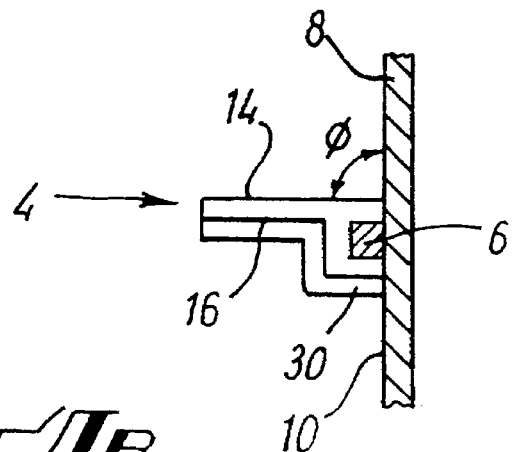
FIG. 4B is a side view of FIG. 4A.

In FIGS. 4A and 4B which show a third embodiment of a portion of the helical wall redistributor 4, baffles 30 are fixed to the lower face 16 of the helical plate 12. The baffles 30 may be fixed to the lower face 16 of the helical plate 12 by welding, gluing or other means.

Figure 5A:
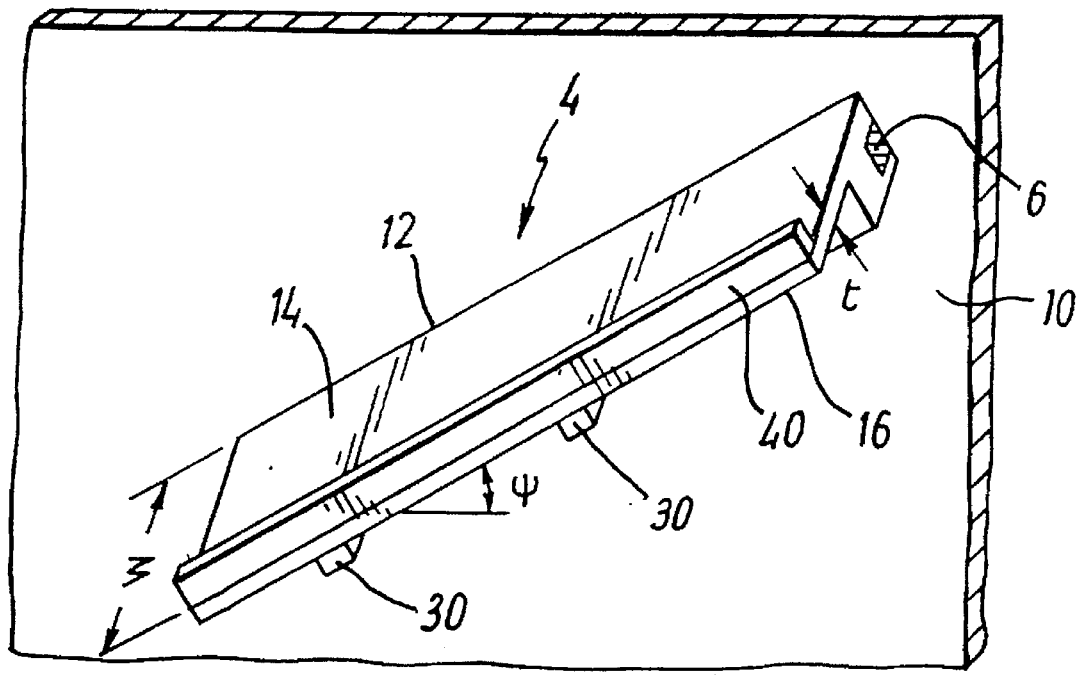
FIG. 5A is an isometric view of a portion of a fourth embodiment of the redistributor provided with a weir.
Figure 5B:
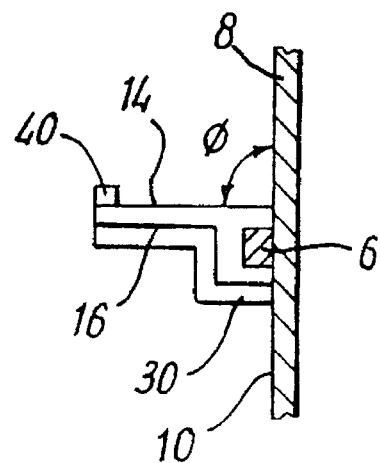
FIG. 5B is a side view of FIG. 5A.

A fourth embodiment of the helical wall redistributor 4 shown in FIGS. 5A and 5B. This is similar to that of FIGS. 4A and 4B but also includes a liquid weir 40 fixed to the upper face 14 of the helical plate 12. The liquid weir 40 is located on the upper face 14 and at an outer edge of the upper face 14 opposite to the edge fixed to the inside face 8 of the column wall 10.

Figure 6B:
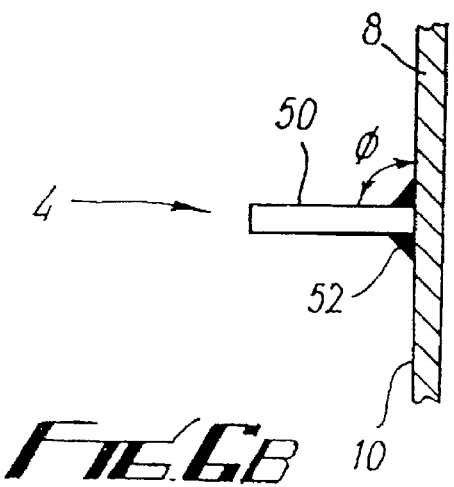
FIG. 6B is a side view of FIG. 6A.

In FIGS. 6A, 6B which show a fifth embodiment of the helical wall redistributor 4, the helical plate 50 is made of flat plate only and is fixed to the column wall 10 by means of a weld 52 on an inside edge 54 of the plate 50 fixed to the column wall 10.

In FIG. 8A two portions of redistributor 4 are shown with a second portion 56 at a lower level than a first portion 50, 56 being connected by a plate 58. In FIG. 8B the first and second portions 50, 56 are not so connected allowing for the helical wall redistributor 4 to be discontinuous.

In use the helical wall redistributor 4 is fixed to the column wall 10 by means of the supporting rail 6 or by directly welding the helical plate 50 to the column wall as shown in FIGS. 6A, 6B, 8A and 8B or by any other suitable means. When using the supporting rail 6 the helical wall redistributor 4 is chosen and slid on to the supporting rail 6 after the removal of a previous helical wall redistributor 4. The helical wall redistributor 4 may be made of shorter pieces slid one next to the other on the supporting rail 6 until the required length is achieved.

The material of construction of the helical wall redistributor 4 and that of the supporting rail 6 may be chosen to suit the specific use, and it may be made from ferrous or non-ferrous metals, polymers or any other suitable material.

In use, the column 2 including any redistributor as shown in FIGS. 1 to 8 is packed (not shown) and a first fluid such as a liquid is introduced at one end of the column 2 with a second fluid such as a gas introduced at the other end of the column 2. The process involves the contact of the liquid and the gas in the packed column 2 to transfer heat or constituents from one phase to another. To prevent liquid and gas channelling in the packed column 2 and to provide an efficient operation and performance of the process the helical wall redistributor 4 is introduced into the column to provide effective liquid and gas distribution.

If the column 2 shown in FIGS. 1A to 1C, packed as described above, is considered to be inclined to the left to represent the effect of tilt and motion which is caused by marine waves or other effects, the following characteristics and advantages of the wall redistributor may be found. The upper face 14 or 24 of the helical wall redistributor 4 wipes the liquid from the column wall 10 and from its adjacent area, with an area of high liquid influx (AHLI) around the areas B, B' and B" as shown in FIGS. 1A and 1C. Part of the wiped liquid is redirected by the upper face 14 or 24 of the helical wall redistributor 4 to the other side of the column 2 at a lower axial level and an area of low liquid influx (ALLI) such as the areas around D, D' and other parts of the packed column 2 which results in an improved liquid irrigation in these areas.

For the inclined column 2 the helical wall redistributor 4 creates a higher resistance to the liquid flow through the column wall area 10 and through the AHLI around the points B, B' and B" forcing part of the liquid away from these areas towards the central axis thus reducing the extent of column cross-sectional area which would otherwise suffer from low liquid flux.

This results in an improved liquid and gas distribution at the lower axial level of the packed column 2.

The lower face 16 or 26 of the helical wall redistributor 4 creates a resistance to gas phase flow and forces it to change direction from the column wall area 10 and its adjacent ALLI and directs it towards the AHLI, leading to an improved contact between the gas and liquid phase.

In FIGS. 4A, 4B, 5A and 5B the presence of the baffles 30 enhance the effect of changing the direction of the gas phase flow and forcing it to change direction. The redistribution of the gas stream reduces the variation in velocity of the gas phase flow over a cross-sectional area of the packed column 2 which in turn leads to improved performance of the packed column 2.

In the case where the packed column 2 is in a vertical position the helical wall redistributor 4 wipes the channelled liquid of the column wall area 10 and directs it back to a main section of the packed column 2 reducing the liquid channelling in the column wall area 10. In addition, the helical wall redistributor 4 creates more turbulent gas flow in the packed column 2 which leads to a more even gas composition over a cross-section.

In FIGS. 5A and 5B the presence of the liquid weir 40 could enhance liquid redistribution to the other side of the packed column 2, for example, when the column is tilted.

The upper face 14 or 24 of the helical wall redistributor 4 may be corrugated to direct part of the wiped liquid towards the central region of the packed column 2, at the helical wall redistributor 4 which results in a further improvement in the performance of the packed column 2.

The improvement in the performance of the packed column 2 is outlined in the table of results (see below).

The diameter of the column 2 is approximately 40 cm with the width of the helical wall redistributors 4 being approximately 8 cm and the angle is in the region of 30°. A helical plate 60 includes holes 62 of approximately 7 mm in diameter. The size of the holes 62 may vary with holes 62 having alternate diameters such as 7 mm and 9.5 mm.

The following symbols referred to in the table of results are:

| ANG | L | G | GS NTU | GS % VE | GSWH NTU | GSWH % VE | $\frac{GSWHi}{(GS)o}$ % | $\frac{GSWHi}{(GS)i}$ % | $\frac{GSWHi}{GSWi}$ % |
|---|---|---|---|---|---|---|---|---|---|
| 0.0 | 67.0 | 42.0 | 3.636 | 100.0 | 6.51 | 100.0 | 178.9 | 178.9 | 125. |
| 3.0 | 67.0 | 42.0 | 2.885 | 79.4 | 5.59 | 85.9 | 153.7 | 193.7 | 114.2 |
| 5.0 | 67.0 | 42.0 | 2.615 | 71.9 | 4.99 | 76.7 | 137. | 190. | * |
| 8.0 | 67.0 | 42.0 | 2.497 | 68.7 | 4.44 | 68.3 | 122.2 | 178. | 112.4 |
| 0.0 | 67.0 | 84.0 | 4.106 | 100.0 | 7.73 | 100.0 | 188.3 | 188.3 | 137. |
| 3.0 | 67.0 | 84.0 | 3.460 | 84.3 | 6.60 | 85.4 | 160.8 | 190.8 | 120.3 |
| 5.0 | 67.0 | 84.0 | 3.024 | 73.6 | 5.65 | 73.1 | 137.7 | 187.0 | * |
| 8.0 | 67.0 | 84.0 | 2.916 | 71.0 | 5.07 | 65.6 | 123.5 | 174. | 128.3 |
| 0.0 | 67.0 | 168. | 4.185 | 100.0 | 8.10 | 100.0 | 193.4 | 193.4 | 142.9 |
| 3.0 | 67.0 | 168. | 3.884 | 92.8 | 6.98 | 86.2 | 166.6 | 179.6 | 121.1 |
| 5.0 | 67.0 | 168. | 3.450 | 82.4 | 5.89 | 72.8 | 140.8 | 170.8 | * |
| 8.0 | 67.0 | 168. | 3.173 | 75.8 | 5.67 | 69.4 | 134.3 | 177.1 | 114.2 |
| 0.0 | 67.0 | 353. | 4.449 | 100.0 | 8.02 | 100.0 | 180.4 | 180.4 | 140.4 |
| 3.0 | 67.0 | 353. | 4.147 | 93.2 | 7.71 | 96.0 | 173.3 | 185.8 | 125.5 |
| 5.0 | 67.0 | 353. | 3.730 | 83.8 | 6.22 | 77.6 | 139.9 | 166.9 | * |
| 8.0 | 67.0 | 353. | 3.494 | 78.5 | 5.77 | 70.7 | 127.4 | 162.2 | 110.6 |
| 0.0 | 168. | 42.0 | 2.823 | 100.0 | 3.62 | 100.0 | 128.1 | 128.1 | 122.4 |
| 3.0 | 168. | 42.0 | 2.111 | 74.8 | 3.19 | 88.4 | 113.2 | 151.4 | 116.1 |
| 5.0 | 168. | 42.0 | 1.896 | 67.2 | 2.88 | 79.6 | 102.0 | 151.8 | * |
| 8.0 | 168. | 42.0 | 1.729 | 61.2 | 2.45 | 67.9 | 86.9 | 141.9 | 100.0 |
| 0.0 | 168. | 84.0 | 3.258 | 100.0 | 4.53 | 100.0 | 138.9 | 138.9 | 115.1 |
| 3.0 | 168. | 84.0 | 2.786 | 85.5 | 4.17 | 92.2 | 128.1 | 149.8 | 116.1 |
| 5.0 | 168. | 84.0 | 2.563 | 78.7 | 3.85 | 85.0 | 118.1 | 150.0 | * |
| 8.0 | 168. | 84.0 | 2.249 | 69.0 | 3.38 | 74.8 | 103.8 | 150.4 | 102.0 |
| 0.0 | 168. | 168. | 3.452 | 100.0 | 4.87 | 100.0 | 141.1 | 141.1 | 109.2 |
| 3.0 | 168. | 168. | 3.311 | 95.9 | 4.62 | 94.9 | 133.5 | 139.5 | 110.8 |
| 5.0 | 168. | 168. | 3.043 | 88.1 | 4.56 | 93.7 | 133.2 | 150. | * |
| 8.0 | 168. | 168. | 2.673 | 77.4 | 4.06 | 83.4 | 117.6 | 151.9 | 103.5 |
| 0.0 | 168. | 353. | 3.844 | 100.0 | 5.01 | 100.0 | 130.3 | 130.3 | 107.7 |
| 3.0 | 168. | 353. | 3.506 | 91.1 | 4.83 | 96.4 | 125.7 | 137.8 | 104.8 |
| 5.0 | 168. | 353. | 3.453 | 89.8 | 4.82 | 96.3 | 125.4 | 141.5 | * |
| 8.0 | 168. | 353. | 3.022 | 78.6 | 4.46 | 89.1 | 116.3 | 147.7 | 105.4 |

*No experiment carried out for these combinations of conditions
NTU - Number of transfer units (measure of performance)
GS - No helical wall redistributor 4 was used
GSW - helical wall redistributor 4 was used but it was not provided with holes
GSWH - helical wall redistributor 4 with holes, each hole being 7 mm in diameter
(GS)o - Value of NTU for GS in a vertical position
(GS)i - Value of NTU for GS at a particular angle of tilt
GSWi - Value of NTU for GSW at a particular angle of tilt.
GSWHi - Value of NTU for GSWH at a particular angle of tilt % VE = $\frac{\text{NTU angle}}{\text{NTU vertical}} \times \frac{100}{1}$ ANG - Angle of tilt of column, degrees
L, G - Flow rate of liquid and gas, liters/minute same axial level, and allowing the rest of the liquid to flow to the other side of the packed column 2 at a lower axial level.

The helical wall redistributor 4 may have extended vanes of equal or different lengths helping to direct part of the wiped liquid and the gas further away from the column wall area 10. The vanes may project inwardly toward the centre of the packed column 2 at a lower level.

FIG. 7 shows a sixth embodiment of the helical wall redistributor 4. A helical plate 60 includes holes 62. The presence of the holes 62 allows some liquid flow to the column area directly below the helical wall redistributor 4 and may let part of the gas in that area to flow through the As can be seen from the table of results the measure of performance is further improved when using a helical wall redistributor 4 with holes 62 and illustrates the advantages of holes for some conditions of operation.

Figure 9:
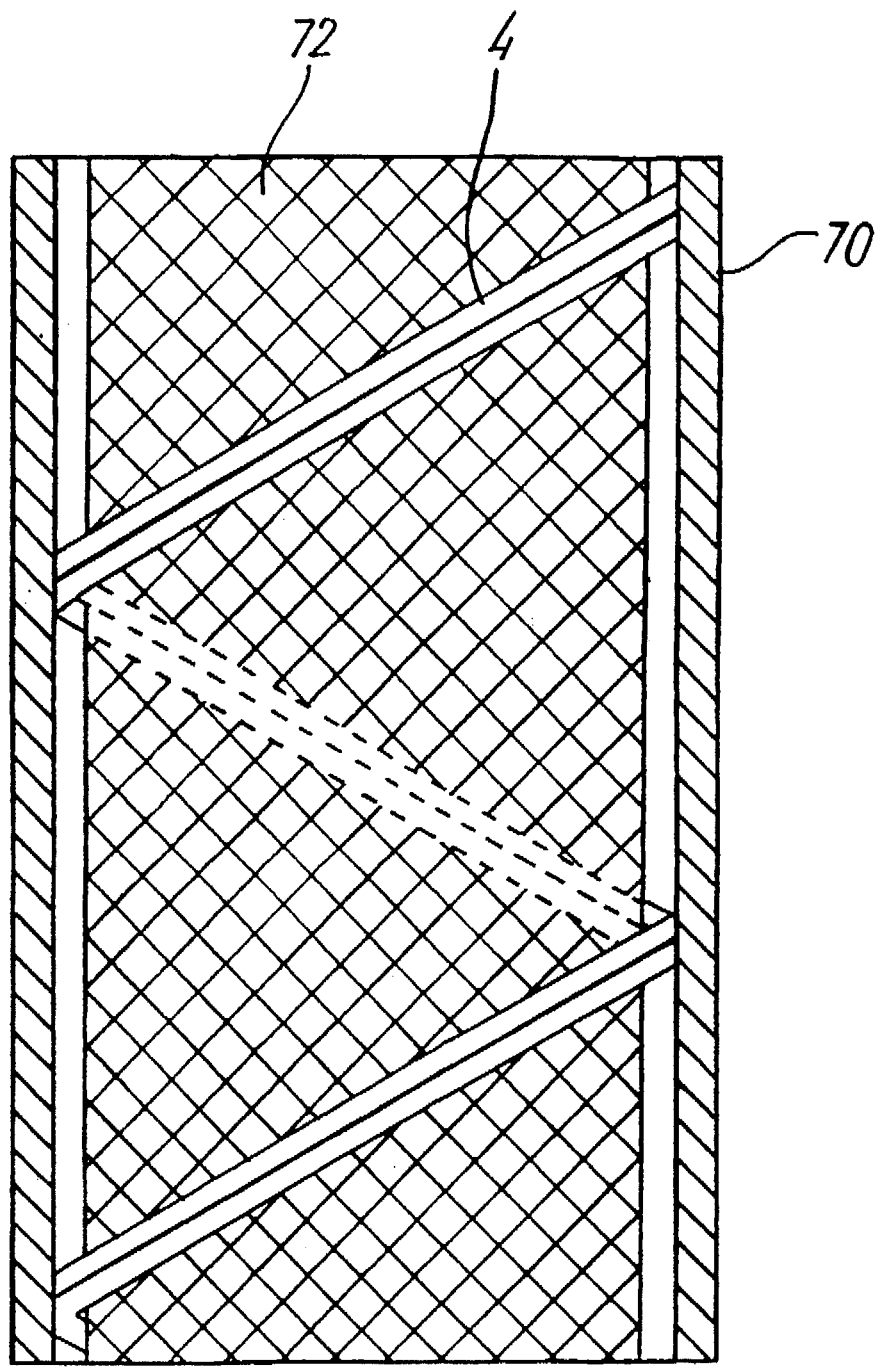
FIG. 9 is a partial breakaway view of a second embodiment of the process vessel and redistributor provided with structured packings.

In FIG. 9 which represents a second embodiment of the process vessel and redistributor 70, the helical redistributor 4 is fixed to structured packings 72 which result in the formation of a continuous helix when segments of the structured packings 72 are stacked together.

The structured packing 72 may include the helical redistributor 4 in the outermost area of the structured packings 72 having one or more layers of the helical redistributor 4.

For the structured packing 72, the helical wall redistributor 4 may be made of a suitable flexible or soft material which may be fixed to the column wall 10 and at the same time make tight contact to the packings 72 themselves.

Figure 10A:
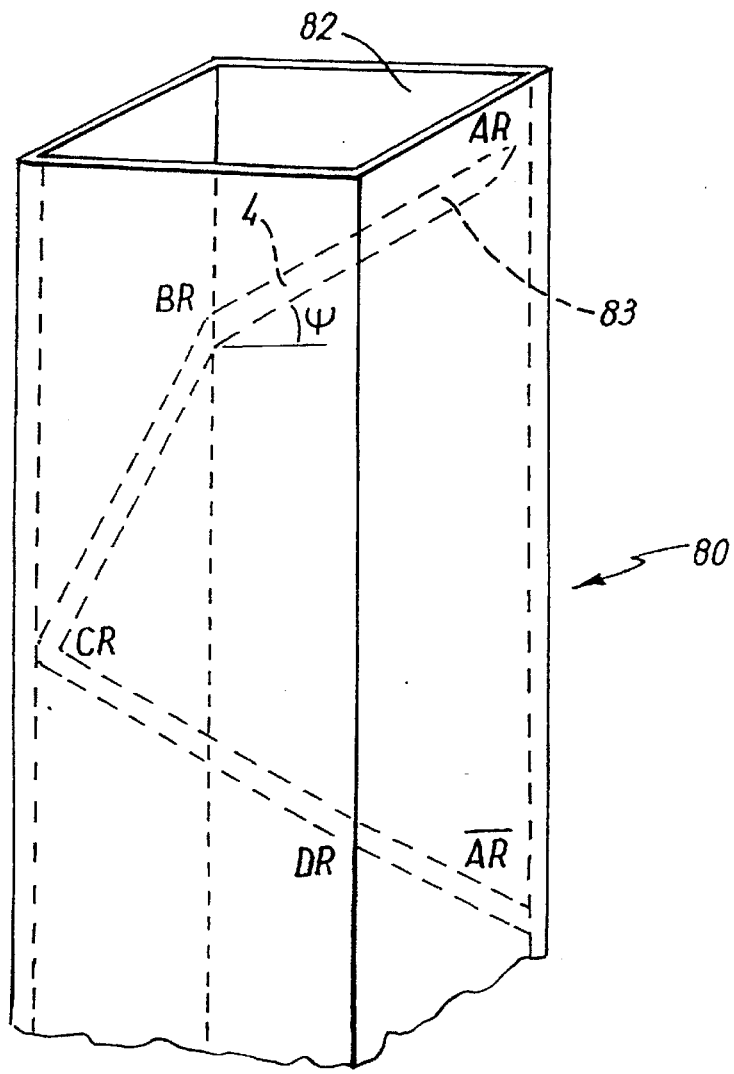
FIG. 10A is an isometric view of a third embodiment of the process vessel and redistributor.
Figure 10B:
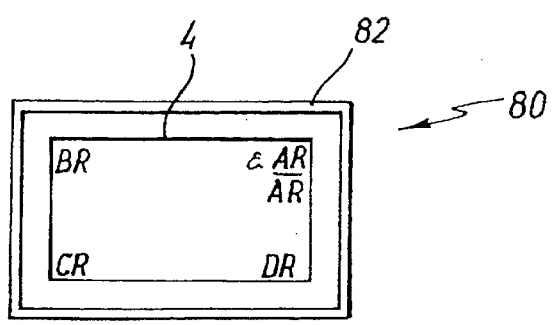
FIG. 10B is a plan view of FIG. 10A.

A third embodiment of a process vessel and redistributor 80 is shown in FIGS. 10A, 10B with the process vessel 82 being in the form of a cuboidal column with a wall redistributor 4 which follows a square helical locus 83 (see FIG. 10A). The redistributor 4 is fixed onto the column walls 10 as in FIGS. 1A to 1C. The length of the wall redistributor 4 is the distance between the points AR and AR passing through the points BR, CR and DR.

Figure 11:
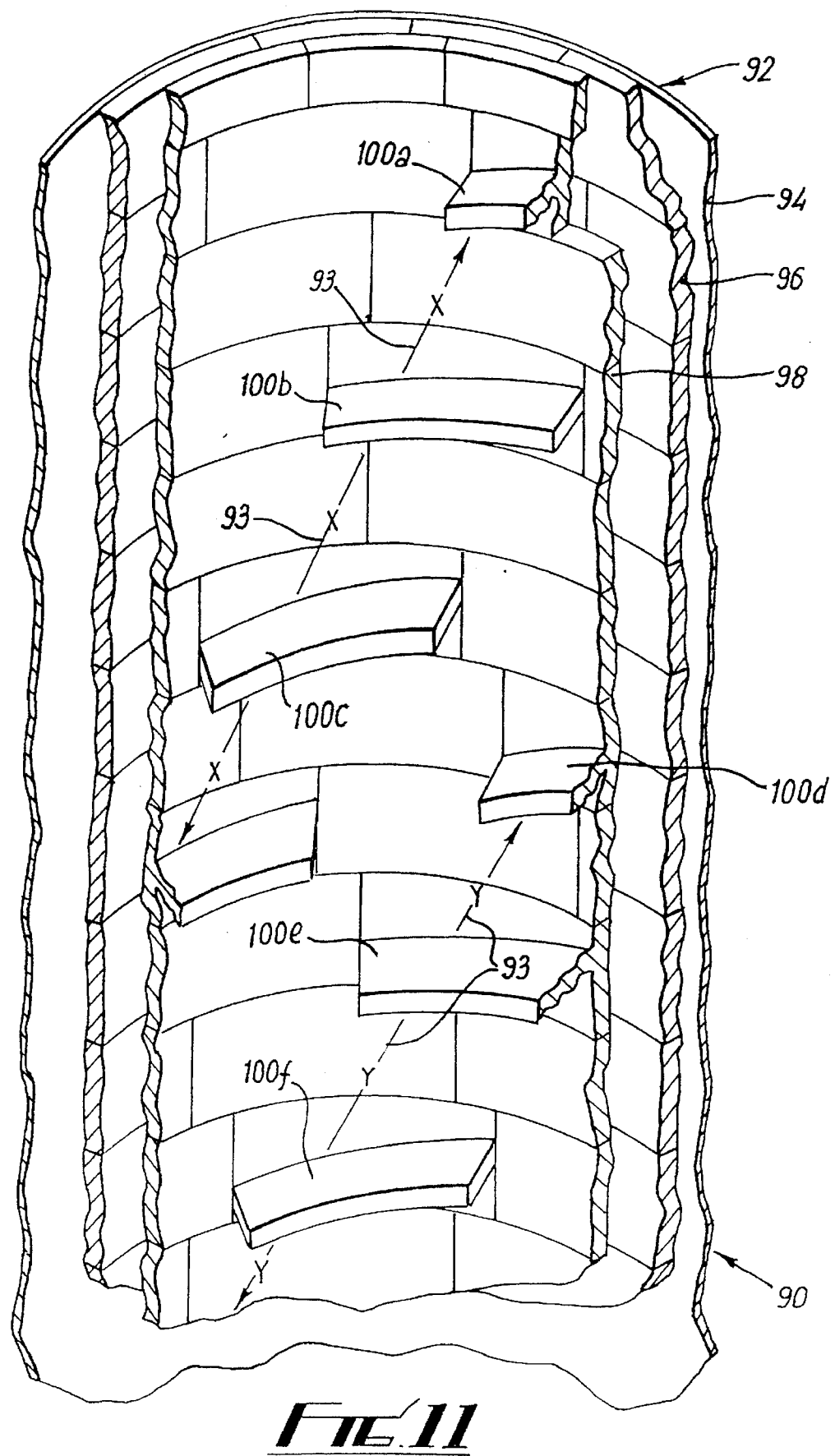
FIG. 11 is a sectional view of a fourth embodiment of the process vessel and redistributor.

FIG. 11 shows a fourth embodiment of a process vessel and redistributor 90, the process vessel 92 being in the form of a cylindrical column. The peripheral wall of the process vessel 92 comprises three separate layers; an outermost layer 94, a middle layer 96 and an inner layer 98. In this particular example, the outermost layer 94 is made from steel and the middle layer 96 and inner layer 98 are both made from brick.

As shown in FIG. 11 the redistributor consists of a number of discrete elements 100. Each element 100 lies on a locus 93, which is generally helical. Each of the elements 100 is integral with or fixed to the inner layer 98 along a generally descending helical locus 93.

Each element 100 of the redistributor has a top surface which is inclined at an angle to the horizontal such that fluid flowing from the top surface of any other element 100 of redistributor 4 is directed in a descending manner on to the top surface of a lower element 100 of the redistributor.

Thus, for example in FIG. 11, part of the liquid which is introduced at one end of the vessel 92, flows down the inside of the vessel and contacts the top surface of element 100a. Part of that liquid is redirected in a descending manner to contact the top surface of a lower element 100b and in turn is partly redirected to the top surface of a still lower element 100c. The other parts of these liquid streams striking elements 100a, 100b and 100c are directed generally towards the central axis of the column. Similar flow patterns occur down the elements 100d, 100e, 100f of redistributor 4.

Figure 12:
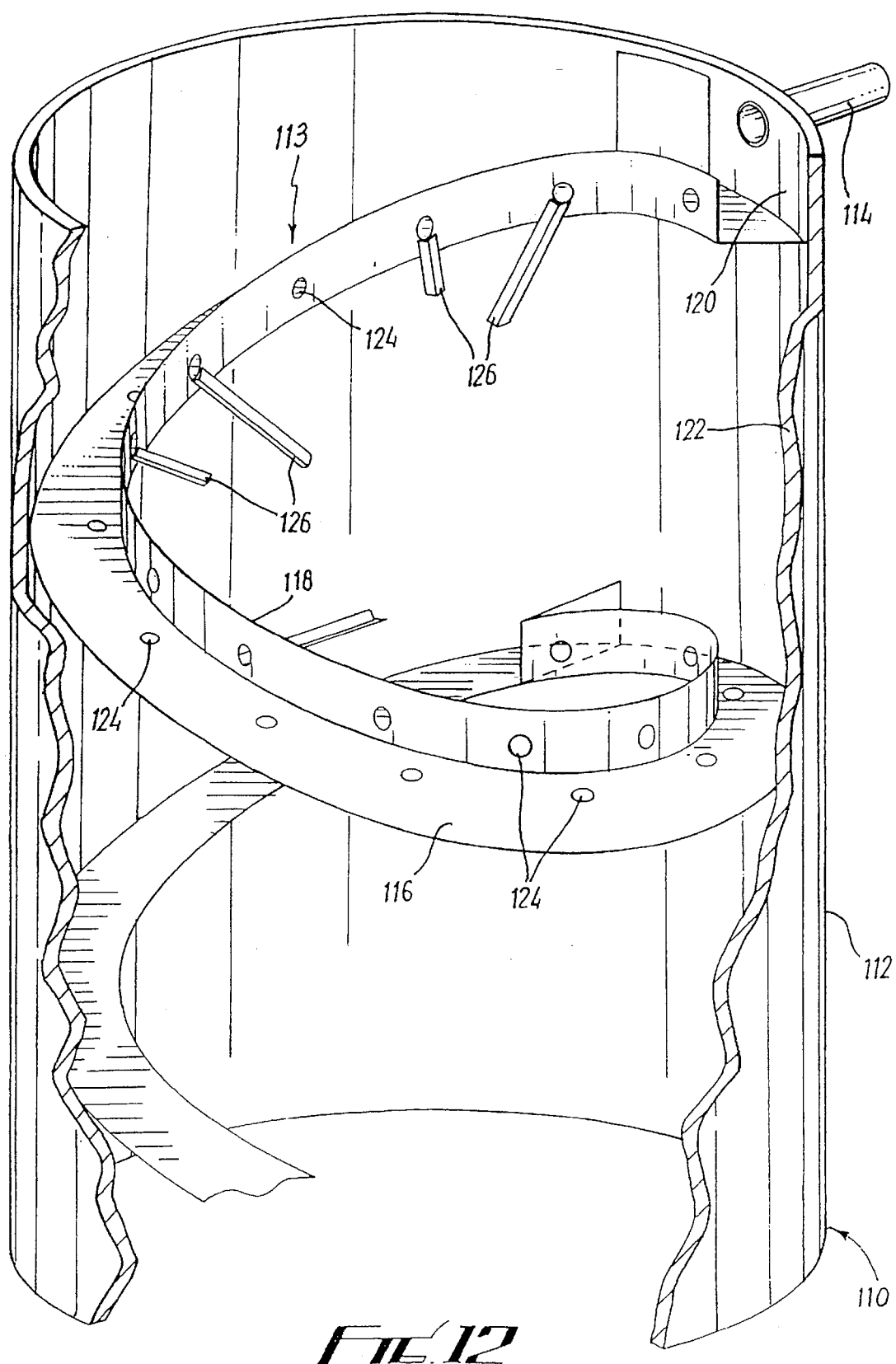
FIG. 12 is a sectional view of the fifth embodiment of the process vessel and redistributor.

A fifth embodiment of the process vessel and redistributor 110 is shown in FIG. 12 with the process vessel 112 being in the form of a cylindrical vessel and having a redistributor 113 which follows a helical locus. At the top end of the process vessel 112 is an inlet tube 114 to allow passage of a fluid such as a liquid or vapour/liquid mixture into the vessel.

The redistributor 113 is in the form of a helical plate 116 having a weir 118 fixed to the upper face and outer edge of the plate 116, opposite to the edge fixed to the inside face 120 of the vessel wall 122. Distributed along the length of the helical plate 116 and weir 118 are holes 124. Extending from a number of holes 124 distributed along the length of the weir 118 are vanes 126. The vanes 126 are of different lengths and project inwardly toward the centre of the vessel 112, directing part of the liquid and gas further away from the internal wall area 120.

Figure 13:
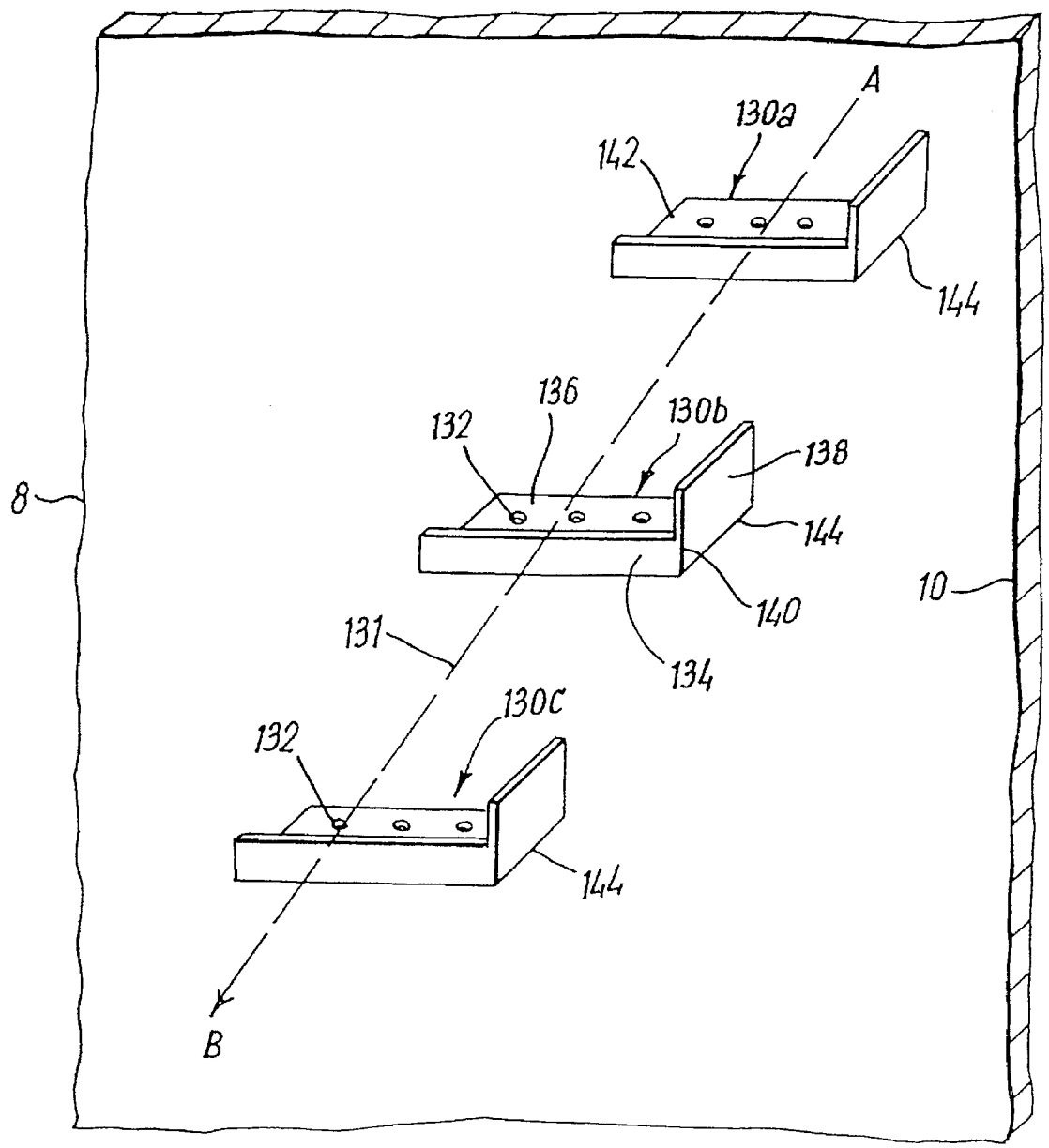
FIG. 13 is an isometric view of a portion of a seventh embodiment of the redistributor.

A seventh embodiment of a redistributor is shown in FIG. 13. The redistributor comprises a number of elements 130 (only three shown) which lie on a locus 131 defined by the line AB. The elements 130 include holes 132, a side weir 134 fixed to the upper face 136 and to an outer edge of the upper face 136 opposite to the edge fixed to the inside face 8 of the column wall 10. A transverse weir 138 is fixed to the upper face 136 and at a side edge of the upper face 136, perpendicular to the side weir 134. The side weir 136 and the transverse weir 138 are partly joined together along an edge 140. The transverse weir 138 is perpendicular to the transverse axis of the column 10 and the horizontal surface of the upper face 136 is perpendicular to the longitudinal axis of the column 10.

In use, the horizontal surfaces of the elements 130 wipes and collects liquid before redirecting it through the holes 132 and/or to an outer edge 142 of the element 130 and then to the packing below. These two effects will cause the liquid flow to have the general direction AB. The presence of both the side weir 134 and the transverse weir 138 enhance redirection of liquid to the outer edge 142 of the plate 130.

The lower surface 144 of an element 130a may be located on the upper edge of the transverse weir 138 of the lower element 130b.

The horizontal plate 130 may be utilised without the presence of the transverse weir 138 or/and without the side weir 134 or it may include an additional transverse weir on the outer edge 142. In the latter case, the redistributor 4 will mainly wipe the liquid from the inside face 8 of the column wall 10.

The cross-section of the redistributor 4 may be of another shape, for example, v, u, square, circular shape or any other suitable cross-sectional area.

When introducing a liquid and gas into the process vessel and redistributor 1, 70, 80, 90 or 110 the liquid and gas may be flowing generally co-currently or counter-currently.

The improvement in the performance in the packed column 2 is due to the reduction in liquid and gas channelling and promotion of mixing of fluids from different radial locations along a greater length of the column. In contrast, previous designs of redistributor function over restricted lengths of column due to their location at discrete intervals along a column. In tilted or moving columns, the other types of redistributors increase the liquid and gas channelling and accelerate its occurrence due to their design which help transfer liquid quickly to the lower inclined side of the column at the same axial levels while the effect of the redistributor 4 of the present invention, on the contrary, reduces channelling due to its novel design. The reduction in liquid and gas channelling results in the design of the packed column 2 being smaller in size and lighter in weight. The size and weight reduction of the packed column 2 is of special importance for offshore industries.

Another advantage of the redistributor 4 of the present invention is that it causes minimal reduction in the cross-sectional area of the packed column 2 at any given horizontal plane, even when the width w of the plate 12, 22, 50 or 60 is large, this being due to the shape of the redistributor 4 which means that at any given cross-sectional area of the packed column 2 the fractional area of the redistributor 4 is very small, making it possible to design the redistributor 4 with a large width w if required.

Another advantage of the invention is that the redistributor is particularly effective in packed columns which are subject to tilt. Such a situation is inherent in offshore floating production systems but can also occur to a lesser extent on land, due for example to installation problems or wind loading.

In addition, the redistributor of the invention allows operation up to the flooding point of a column without a redistributor. In contrast, existing redistributors are potential "bottlenecks" and can promote flooding.

The helical wall redistributor may be used to introduce an intermediate inlet stream without the need of a specially designed liquid introduction tray. This could be done, for example, by increasing the number and length of the extended vanes, increasing the width, w, the use of a side liquid weir, and by increasing the number and/or size of holes of the helical wall redistributes which is located below the feed pipe.

The helical wall redistributor may also be used to draw liquid from the column at intermediate locations by, for example, supplying small parts of the helical wall redistributor with a liquid collecting funnel which is ended by a pipe which passes through the column wall. Additional design consideration may be used to improve this function, for example, by using larger holes, the addition of a transversal liquid weir downstream of the collection area, the introduction of a side weir, and the reduction of the number and size of holes upstream of the collection part of the helical wall redistributor.

The process vessel may be of a variety of shapes and sizes and may have tapered type formations.

Modifications and improvements may be incorporated without departing from the scope of the invention.

We claim:

1. A process vessel for achieving contact between at least one fluid passing through the vessel and a packing material contained therein, the process vessel comprising a peripheral wall disposed around a longitudinal axis and having an inlet for permitting entry of fluid into the vessel and an outlet for permitting exit of fluid from the vessel, the vessel including a redistributor connected to the inside surface of the peripheral wall, and in which the locus of the connection between the redistributor and the peripheral wall is neither perpendicular nor parallel to the longitudinal axis, wherein, on any plane drawn at a right angle to the longitudinal axis, a cross-sectional area of the redistributor on the plane is less than 5% of a cross-sectional area of the process vessel on the plane.

2. A process vessel according to claim 1, wherein the redistributor is in the form of a single element.

3. A process vessel according to claim 1, wherein the redistributor comprises a number of discontinuous elements.

4. A process vessel according to claim 1, wherein the cross-sectional area of the redistributor on the plane is less than 1% of the cross-sectional area of the process vessel on the plane.

5. A process vessel according to claim 1 wherein the redistributor comprises at least one element having an edge connected to the peripheral wall and another edge located between the peripheral wall and the longitudinal axis.

6. A process vessel according to claim 5, wherein each element of the redistributor is positioned on the internal surface of the peripheral wall so that any straight line along the internal surface of the peripheral wall passes through an element of the redistributor.

7. A process vessel according to claim 1, wherein the redistributor has a number of apertures through which fluid within the vessel may pass.

8. A process vessel according to claim 1, wherein the process vessel is symmetrical about the longitudinal axis.

9. A process vessel according to claim 1, wherein the locus is generally spiral.

10. A process vessel according to claim 1, wherein the locus is generally helical.

11. A process vessel according to claim 1, wherein the process vessel is a contacting column for achieving internal contact between a first and a second fluid flowing through the contacting column and the packing material.

12. A process vessel according to claim 1, wherein the redistributor includes projections which project from the redistributor towards the centre of the vessel.

13. A process vessel according to claim 1, wherein the redistributor includes a diverter for diverting fluid flowing along the redistributor.

14. A process vessel according to claim 13, wherein the diverter is located adjacent an edge of the redistributor remote from the peripheral wall.

15. A process vessel according to claim 13 or claim 17, wherein the diverter is in the form of a ledge.

16. A process vessel according to claim 1, wherein the redistributor comprises heat transfer means to permit heat to be added to or removed from fluid within the vessel.

17. A process vessel according to claim 1, wherein the redistributor includes liquid distribution means which distributes liquid entering the vessel.

* * * * *